July 17, 1962 — R. F. WILCOX — 3,044,135
LOCKING PIPE HOLDER
Filed Nov. 3, 1960 — 2 Sheets-Sheet 1

INVENTOR.
ROY F. WILCOX

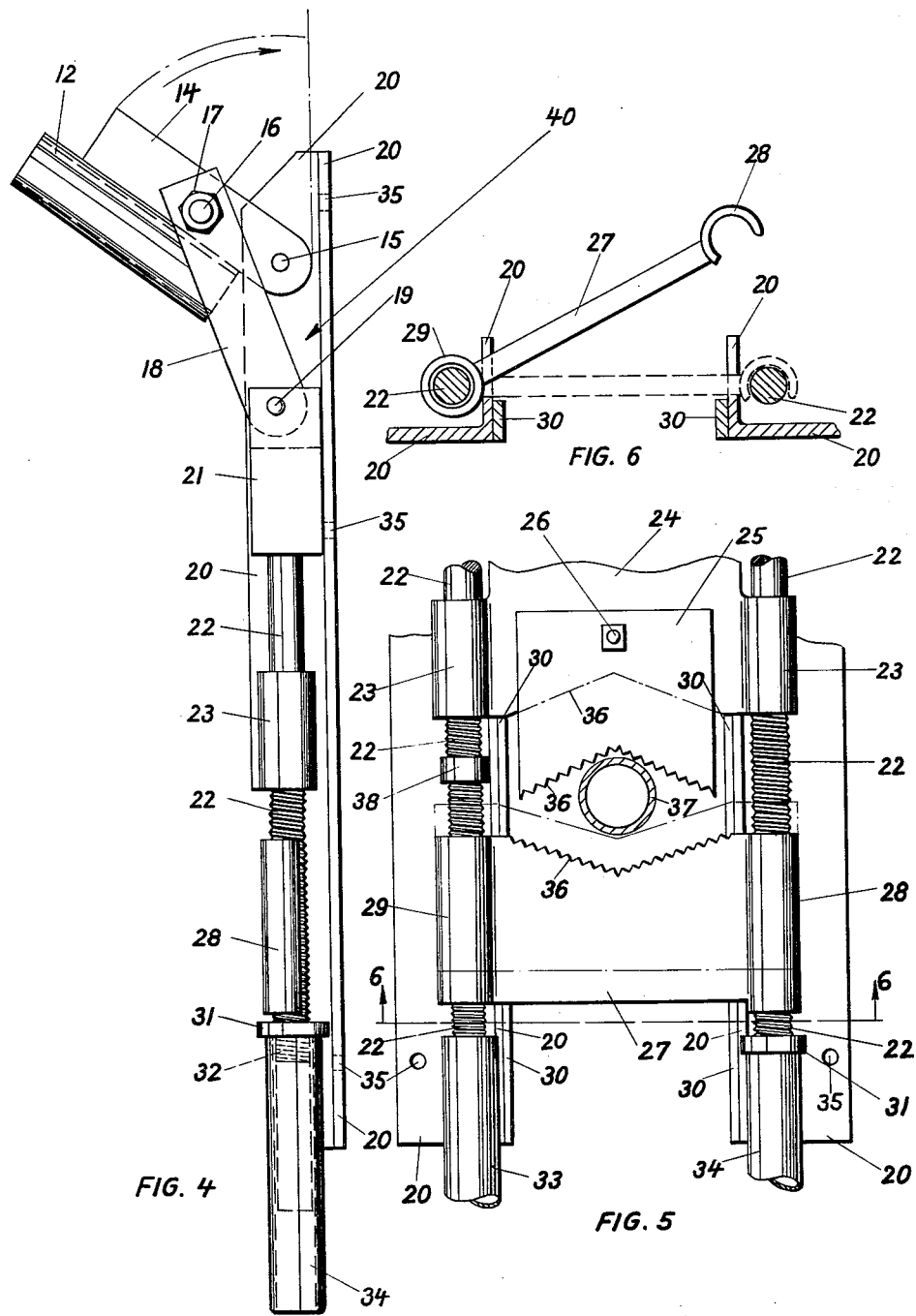

United States Patent Office 3,044,135
Patented July 17, 1962

3,044,135
LOCKING PIPE HOLDER
Roy F. Wilcox, R.F.D. 4, McCook, Nebr.
Filed Nov. 3, 1960, Ser. No. 67,067
4 Claims. (Cl. 24—263)

This invention relates to a clamping or gripping device, particularly one which is adapted to grip a vertically extending well pipe to prevent it from falling into the wall.

Briefly, the invention comprises a fixed frame having mounted thereon a non-movable jaw member and an opposing reciprocating jaw operated by a toggle mechanism so as to move the latter jaw member toward the former jaw member for gripping a piece of vertically extending pipe therebetween.

It has been found that conventional well pipe holders now in common use sometimes permit a well pipe which they are holding to slip and drop downwardly within the well. This happens most frequently when the well pipe is rotated. Accordingly, it is an object of this invention to provide a well pipe holder that will positively grip and hold the pipe and will not release the same even when it is rotated.

Another object of the invention is to provide a clamping device that will hold any size of pipe or rod from one-quarter inch to four inches in diameter without changing the size of the pipe holding device. A simple manually adjustable device on the pipe holder permits various sized pipes to be gripped thereby.

It is another object of the invention to provide a pipe holder that will hold a vertically suspended string of pipes stationary even when a strong horizontal pressure is applied in any direction to the pipe when segments are being removed or added thereto.

Another object of the invention is to provide a pipe holder having a sliding jaw that may be quickly manually operated for gripping or releasing the pipe.

Still another important object of the invention is to provide a tension element that may be set in a locked position for holding a string of pipe.

Yet another object of the invention is to provide a pipe holder having elements protecting the threads of the adjustable tension bolts.

Still another object of the invention is to provide a nut and tension bolt adjusting means on a pipe holder for separating the contacting jaws thereof.

Yet still another important object of the invention is to provide means whereby differently shaped jaws may be quickly attached or detached from the pipe holder.

Yet another object of the invention is to provide a device having detachable jaws whereby different type jaws may be attached to the device so that it may be used for other purposes such as a vise.

Yet another object of the invention, is to provide a pipe holding device that operates to grip the pipe by means of tension means rather than compression means.

Still yet another object of the invention is to provide a pipe holder that is relatively economical to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a side view of FIGURE 2 showing the device in its released position;

FIGURE 5 is a plan view showing in solid lines the device in the released position, and in dotted lines the device in its clamping position; and FIGURE 6 is an elevational cross sectional view taken substantially on the plane of line 6—6 in FIGURE 5.

Figures 1, 2, 3:
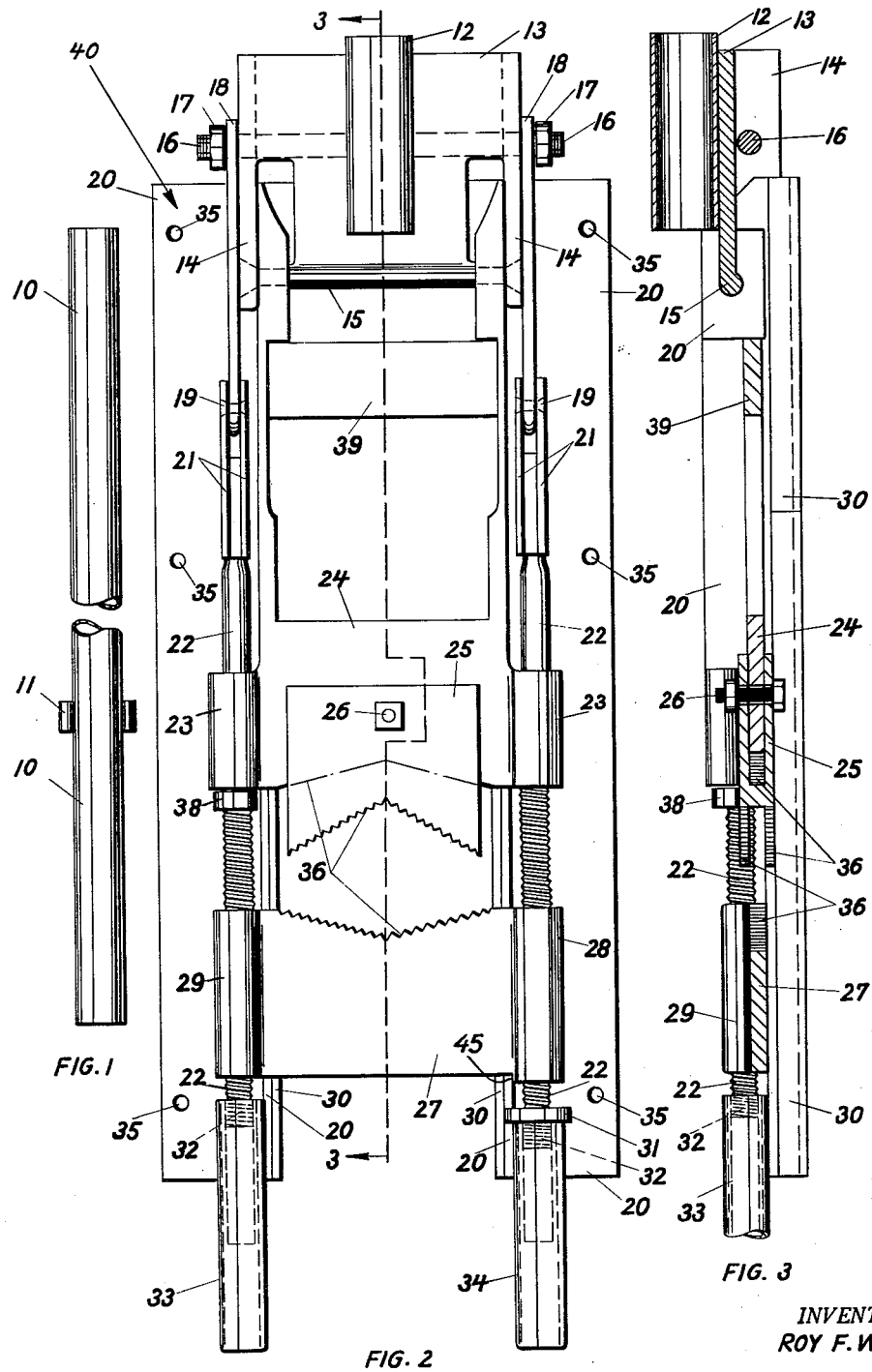
FIGURE 1 is a plan view of the handle assembly.
FIGURE 2 is a plan view of the assembled pipe holding device.
FIGURE 3 is a cross sectional view taken substantially on the plane of line 3—3 in FIGURE 2.

The frame assembly 40 comprises two parallel elongated angle iron members 20 which are rigidly secured together by transverse plates 39 and 24 which are fixed to the angle members by conventional means such as welding. Also rigidly secured to the angle members 20 are parallel guide sleeves 23. Elongated plate members 30 are rigidly attached to the sides of the angle members 20 for reinforcing the same. Various parts of the frame may be welded together or alternatively cast in one piece.

Slidable in the sleeves 23 are parallel rods 22 which are smaller in diameter than the bores in the sleeves and have one of their ends threaded and their other ends flattened and secured to plate members 21 for forming yokes which are pivotally secured to tension links 18. The threaded ends 22 of the rods have adjusting sleeves 33 and 34 threaded thereon. If desired, a nut, not shown, may also be threaded on 22 for tightening against the end of 33 and 34 for locking them in any adjusted position.

As shown in FIGURE 2, the movable gripping jaw 27 has the sleeve 29 fixed to one side thereof and a C-shaped support member 28 fixed to the other side thereof. An enlarged opening through sleeve 29 slidably receives the reciprocal threaded end 32 of the rod 22. The C-shaped member 28 normally envelops and is supported upon the opposite rod 22. The longitudinal position of clamp member 27 is determined by the position of adjusting sleeves 33 and 34.

The frame plate 24 has secured thereto by nut and bolt means 26 a fixed gripping plate 25. The nut and bolt securing means permits the plate 25 to be removed and replaced with other plates of different sizes and shapes. Both plates 25 and 27 have opposing serrated gripping surfaces 36. Alternatively, plate member 24 may also have serrated gripping surfaces 36 as indicated by the dotted lines in FIGURE 2 and shown at 36 in FIGURE 3.

Pivoted at one end of the angle members 20 and to the vertically extending flanges thereof, is a toggle operator comprising a flat plate 13 having flanges 14 secured perpendicular thereto. The inner edge of the plate 13 has a bolt or rivet member 15 integrally formed or welded thereto. U-shaped slots in the plate 13 straddle the ends of the vertical flanges on angles 20, and the plate is pivotally connected to these flanges by having the ends of the member 15 extending through and rotatable in bores in the flanges and extending into and secured to members 14. The upper surface of the plate 13 has a sleeve 12 secured to its central portion.

Studs 16 extend through axially aligned bores in the ends of links 18 and in the flanges 14 for pivotally securing these members together. The ends of the stud 16 have threads thereon for receiving the nut 17.

As shown in FIGURE 1, the handle 10 comprises a pipe having stops 11 secured thereto.

Apertures 35 in the horizontally extending flanges of the frame angles 20 permit the frame 40 to be bolted to stringers for extending the frame over a wide opening such as a hole for a well.

In operation, the frame 40 is bolted in place by means of the holes 35, and the handle 10 is inserted into sleeve 12 until stops 11 abut the outer ends of this sleeve. The end of the handle is raised upwardly for pivoting the sleeve 12 about the member 15 as shown in FIGURE 4. The gripping plate 27 is then rotated in a counterclockwise direction about rod 22 and sleeve 29 as shown in FIGURE 6. While this permits the pipe 37, which forms no part of the invention, to be inserted adjacent the fixed gripping plate 25. The plate 27 is then rotated clockwise to its dotted line position shown in FIGURE 6, and the plate 27 then adjusted by means of threaded sleeves 33 and 34 to its proper gripping position. The sleeves 33 and 34 and plate 27 may be locked in their adjusted position by means of locking nuts 31 and 38.

To firmly and positively grip the pipe 27, the handle 10 is pulled downwardly so as to rotate sleeve 12 in a clockwise direction as indicated by the arrow in FIGURE 4. Clockwise rotation of sleeve 12 and members 14 pull link 18, yokes 21, rods 22, sleeves 33–34 and plate 27 upwardly as viewed in FIGURE 2 while thereby tightly gripping pipe 37 between the serrated jaws 36. By moving the handle 10 downwardly until flanges 14 abut the upper surfaces of the horizontal flanges or angles 20, the pivot axis of member 16 is moved below or to an over-center position with respect to the axes of pivot points 15 and 19, thereby locking the pipe holder in its gripping position.

For gripping pipes of different sizes, or for gripping objects of different shapes, the gripping plates 25 and 27 may be replaced with ones having different shape and spaced gripping edges simply by removing and replacing bolt means 26 and threaded sleeves 33 and 34.

Arcuate support 28 extends slightly beyond the outer edge of plate 27 to form a projection 45 as shown in FIGURE 2. Threaded sleeve 34 has an integral flange 31 on its inner end which has an annular recess therein for receiving the projection 45 and thereby locking the support 28 on the threaded portion of bar 22. Normally, the plate 27 is adjusted by means of the threaded sleeve 33 and then after the pipe has been inserted between the teeth 36, the pipe 37 is lowered into position and locked in place by screwing sleeve 34 until the recess in flange 31 receives the projection 45.

The threaded sleeves or nuts 33 and 34, since they encircle the end of threaded rods 22, serve the additional function of protecting the threaded ends 22 from damage.

By having the movable member 27 operated by tension members rather than compression members, the members may be made substantially smaller thereby resulting in elimination of considerable weight and savings in material without weakening the strength or gripping power of the device. Due to the interchangeability of the gripping plates 25 and 27, it is apparent that by using different gripping members, the device may be used for other purposes such as a vise or crushing machine.

Although the gripping device may be made of any material having the necessary strength and other requirements, it is contemplated that the device be constructed of steel having a high tensile strength. The teeth 36 should be hardened such as by heat treating or being formed of hardened inserts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gripping device comprising a frame, a pair of opposing gripping members mounted on the frame for relative movement towards and away from one another, spaced parallel tension rods connected to each side of one of said members, operating means connected to said tension rods for applying a pulling force thereto and moving one gripping member towards the other for gripping an object, said operating means movable to an over-center position for locking said members in gripping position, adjustable abutments on said tension rods drivingly engaging said one gripping member, said operating means comprising a single handle pivoted at one end to said frame, a pair of links pivoted at one end to said handle and at their other ends to said tension rods.

2. A device as recited in claim 1 wherein said one gripping member is pivoted on one of said rods and has a semi-circular seat for seating engagement on and partially encircling said other rod.

3. A device as defined in claim 2, wherein said rods are slidable in bores extending longitudinally through the side of said frame, at least one of said gripping members being mounted by releasable means, and both of said gripping members being formed of steel and having hardened gripping teeth.

4. A device as defined in claim 2 wherein said rods are threaded, said abutments comprising nuts threaded on said rods and on each side of said one gripping member, said semi-circular seat having one end extending longitudinally beyond said one gripping member, one of said nuts having an annular recess adapted to receive said one end for locking said one gripping member in operative gripping position.

References Cited in the file of this patent

UNITED STATES PATENTS

| | | |
|---|---|---|
| 201,591 | Breckenridge | Mar. 26, 1878 |
| 480,904 | Chapman et al. | Aug. 16, 1892 |
| 540,262 | Lightner | June 4, 1895 |
| 649,916 | Dietrich | May 22, 1900 |
| 1,917,377 | Leiter | July 11, 1933 |
| 2,093,210 | Powell | Sept. 14, 1937 |
| 2,574,281 | Olson | Nov. 6, 1951 |
| 2,650,787 | Valentine | Sept. 1, 1953 |
| 2,926,387 | Lombardo et al. | Mar. 1, 1960 |

FOREIGN PATENTS

| | | |
|---|---|---|
| 822,525 | Germany | Nov. 26, 1951 |
| 518,793 | Great Britain | Mar. 7, 1940 |